(12) United States Patent
Iwaki et al.

(10) Patent No.: US 12,413,122 B2
(45) Date of Patent: Sep. 9, 2025

(54) ELECTRIC POWER TOOL

(71) Applicant: MAX CO., LTD., Tokyo (JP)

(72) Inventors: Kozo Iwaki, Tokyo (JP); Norihiro Nagai, Tokyo (JP); Takahiro Hashimoto, Tokyo (JP)

(73) Assignee: Max Co., Ltd., Tokyo (JP)

( * ) Notice: Subject to any disclaimer, the term of this patent is extended or adjusted under 35 U.S.C. 154(b) by 343 days.

(21) Appl. No.: 18/131,931

(22) Filed: Apr. 7, 2023

(65) Prior Publication Data
US 2023/0327525 A1  Oct. 12, 2023

(30) Foreign Application Priority Data

Apr. 8, 2022  (JP) .................................. 2022-064774

(51) Int. Cl.
*H02K 11/33* (2016.01)
*B25F 5/02* (2006.01)
(Continued)

(52) U.S. Cl.
CPC ............ *H02K 11/33* (2016.01); *H02J 7/0013* (2013.01); *H02J 7/0034* (2013.01); *H02J 7/0063* (2013.01); *H02K 7/145* (2013.01); *H02K 11/0094* (2013.01); *H02K 11/35* (2016.01); *B25F 5/02* (2013.01); *H02K 2211/03* (2013.01)

(58) Field of Classification Search
CPC ........ H02K 7/145; H02K 11/33; H02K 11/35; H02K 11/0094; H02K 2211/03; H02J 7/0013; H02J 7/0034; H02J 7/0063; B25F 5/02
See application file for complete search history.

(56) References Cited

U.S. PATENT DOCUMENTS 8,813,866 B2   8/2014 Suzuki
9,602,041 B1 *  3/2017 Khalaf ................ H02P 23/0077
(Continued)

FOREIGN PATENT DOCUMENTS

JP   2012035384 A  *  2/2012
JP   2014-529320 A     11/2014
(Continued)

OTHER PUBLICATIONS

Sep. 7, 2023—(EP) Extended Search Report—App 23167379.9.

*Primary Examiner* — Jeremy A Luks
(74) *Attorney, Agent, or Firm* — Banner & Witcoff, Ltd.

(57) ABSTRACT

There is provided an electric power tool including: a second voltage supply portion configured to supply, based on a first power supply voltage supplied from a first battery, a second operating voltage for operating a second controller, and configured to supply, based on a second power supply voltage supplied from a second battery, the second operating voltage for operating the second controller; a first voltage line configured to connect a first voltage supply portion and the second voltage supply portion and configured to supply the first power supply voltage; and a backflow suppression circuit configured to permit a current to flow from the first voltage supply portion to the second voltage supply portion in the first voltage line and configured to suppress a current from flowing from the second voltage supply portion to the first voltage supply portion in the first voltage line.

8 Claims, 4 Drawing Sheets

(51) Int. Cl.
*H02J 7/00* (2006.01)
*H02K 7/14* (2006.01)
*H02K 11/00* (2016.01)
*H02K 11/35* (2016.01)

(56) References Cited

U.S. PATENT DOCUMENTS

| | | | |
|---|---|---|---|
| 2006/0254666 A1* | 11/2006 | Kusakari | E04G 21/122 |
| | | | 140/57 |
| 2012/0293096 A1 | 11/2012 | Mizoguchi et al. | |
| 2014/0151079 A1 | 6/2014 | Furui et al. | |
| 2014/0158389 A1 | 6/2014 | Ito et al. | |
| 2014/0159640 A1 | 6/2014 | Yoshikawa et al. | |
| 2014/0159662 A1 | 6/2014 | Furui et al. | |
| 2014/0159919 A1 | 6/2014 | Furui et al. | |
| 2014/0159920 A1 | 6/2014 | Furui et al. | |
| 2017/0126038 A1 | 5/2017 | Yoshikawa et al. | |
| 2018/0008304 A1* | 1/2018 | Nakamura | G02B 23/2484 |
| 2018/0076639 A1 | 3/2018 | Furui et al. | |
| 2019/0334357 A1 | 10/2019 | Furui et al. | |
| 2020/0169148 A1* | 5/2020 | Nakamoto | H05K 1/18 |
| 2020/0343744 A1 | 10/2020 | Furui et al. | |
| 2020/0403544 A1* | 12/2020 | Ishikawa | H02P 23/0077 |
| 2021/0367435 A1 | 11/2021 | Furui et al. | |
| 2023/0327594 A1* | 10/2023 | Iwaki | H02K 11/0094 |
| | | | 318/17 |

FOREIGN PATENT DOCUMENTS

| | | | | |
|---|---|---|---|---|
| JP | 2019073995 A | * | 5/2019 | F04B 35/04 |
| JP | 2019146279 A | * | 8/2019 | H01M 10/44 |
| WO | 2021064860 A1 | | 4/2021 | |

* cited by examiner

ELECTRIC POWER TOOL

CROSS-REFERENCE TO RELATED APPLICATIONS

This application is based on and claims priority to Japanese Patent Application No. 2022-064774 filed on Apr. 8, 2022, the contents of which are incorporated herein by way of reference.

TECHNICAL FIELD

The present invention relates to an electric power tool.

BACKGROUND ART

In recent years, there is an electric power tool improved in convenience by mounting a wireless communication device on a main body of the electric power tool.

Patent Literature 1 discloses such an electric power tool on which a wireless communication device can be mounted. The electric power tool includes an electric motor, a communication adapter on which a communication device is mounted, and a battery configured to be detachable.

Patent Literature 1: JP2014-529320A

However, since the electric power tool in Patent Literature 1 includes only a single battery, electric power of the battery is consumed not only by the electric motor but also by the communication device, and a sufficient working time cannot be provided. In addition, when the battery is removed from the main body, communication cannot be performed.

Therefore, as described in Patent Literature 1, addition of a built-in power supply to the electric power tool can also be considered.

However, when a built-in power supply is mounted on the electric power tool, a situation is observed in which even electric power of the built-in power supply sharing a power supply line is consumed for driving the electric motor while the electric motor is driven by being supplied with electric power from the main battery, and the built-in power supply cannot be effectively used.

Therefore, an object of the present invention is to provide an electric power tool in which a plurality of batteries can be mounted and effectively used.

SUMMARY OF INVENTION

There is provided an electric power tool including a power supply device for the electric power tool. The power supply device includes: a first controller configured to control an electric motor mounted in the electric power tool; a first voltage supply portion configured to supply, based on a first power supply voltage supplied from a first battery, a first operating voltage for operating the first controller; a second controller configured to control a communication device mounted in the electric power tool; a second voltage supply portion configured to supply, based on the first power supply voltage supplied from the first battery, a second operating voltage for operating the second controller, and configured to supply, based on a second power supply voltage supplied from a second battery, the second operating voltage for operating the second controller; a first voltage line configured to connect the first voltage supply portion and the second voltage supply portion and configured to supply the first power supply voltage; a second voltage line configured to connect the first voltage supply portion and the second voltage supply portion and configured to supply a second voltage lower than the first power supply voltage; and a backflow suppression circuit configured to permit a current to flow from the first voltage supply portion to the second voltage supply portion in the first voltage line and configured to suppress a current from flowing from the second voltage supply portion to the first voltage supply portion in the first voltage line.

When the first power supply voltage is applied from the first battery to the first voltage line, the power supply device for the electric power tool may be configured to execute a first operation in which a current flows from the first battery to the second voltage supply portion in the first voltage line and a current flows from the first voltage supply portion to the second voltage supply portion in the second voltage line.

When the first power supply voltage is not applied from the first battery to the first voltage line, the power supply device for the electric power tool may be configured to execute a second operation in which no current flows in the first voltage line and a current flows from the second voltage supply portion to the first voltage supply portion in the second voltage line.

Further, there is provided an electric power tool. The electric power tool includes: the power supply device for the electric power tool as exemplified in the embodiments; the electric motor; the communication device; the second battery; and the first battery configured to be detachably attached to a main body including the power supply device for the electric power tool, the electric motor, the communication device and the second battery.

The "electric power tool" of the present invention refers to a tool that uses electricity as a power source and that is used for work such as machining. The "electric power tool" of the present invention includes, in addition to a product used alone, a component or a module that constitutes a part of another device. For example, the "electric power tool" of the present invention may be a module attached to equipment of a robot arm. Further, the "electric power tool" of the present invention may be a component constituting a part of a machine tool having a plurality of functions.

DESCRIPTION OF EMBODIMENTS

Hereinafter, embodiments of the present invention will be described with reference to the drawings. The following embodiments are examples for explaining the present invention, and it is not intended to limit the present invention only to the embodiments.

Figure 2:
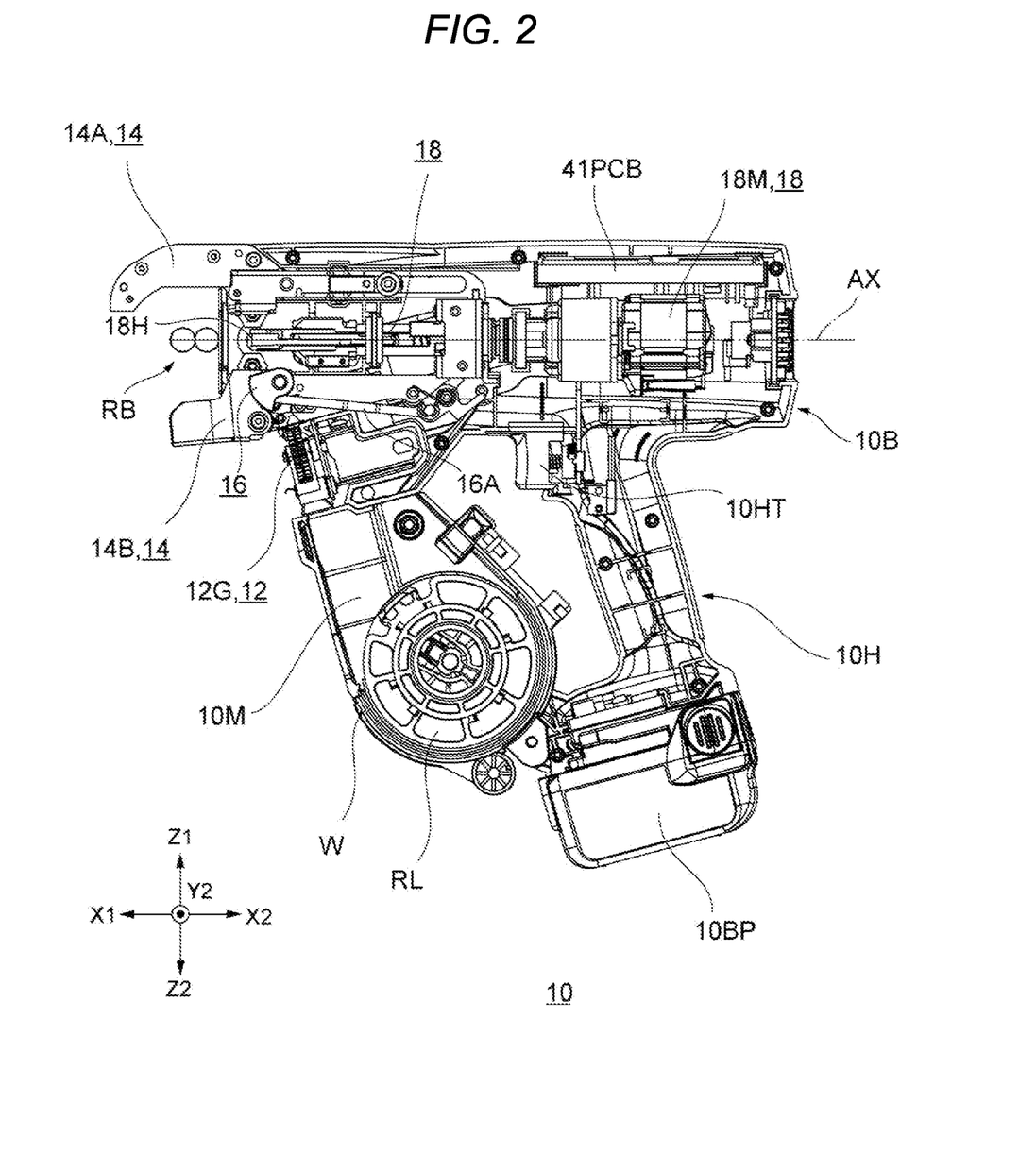
FIG. 2 is a cross-sectional view of the electric power tool according to the embodiment.

For the sake of convenience, a left-right direction of the paper surface of FIG. 2 may be referred to as a front-rear direction X (an example of a "first direction"), and in particular, a left direction of the paper surface may be referred to as a front side X1 and a right direction of the paper surface may be referred to as a rear side X2; an up-down direction of the paper surface may be referred to as an up-down direction Z (an example of a "second direction"), and in particular, an upper direction of the paper surface may be referred to as an upper side Z1 and a lower direction of the paper surface may be referred to as a lower side Z2; a direction perpendicular to the front-rear direction X and the up-down direction Z may be referred to as a right-left direction Y (an example of a "third direction"), and in particular, a right direction may be referred to as a right side Y1 and a left direction may be referred to as a left side Y2 when facing the front side X1. This is used for the purpose of explaining a relative directional relationship, and does not indicate an absolute direction.

Figure 1:
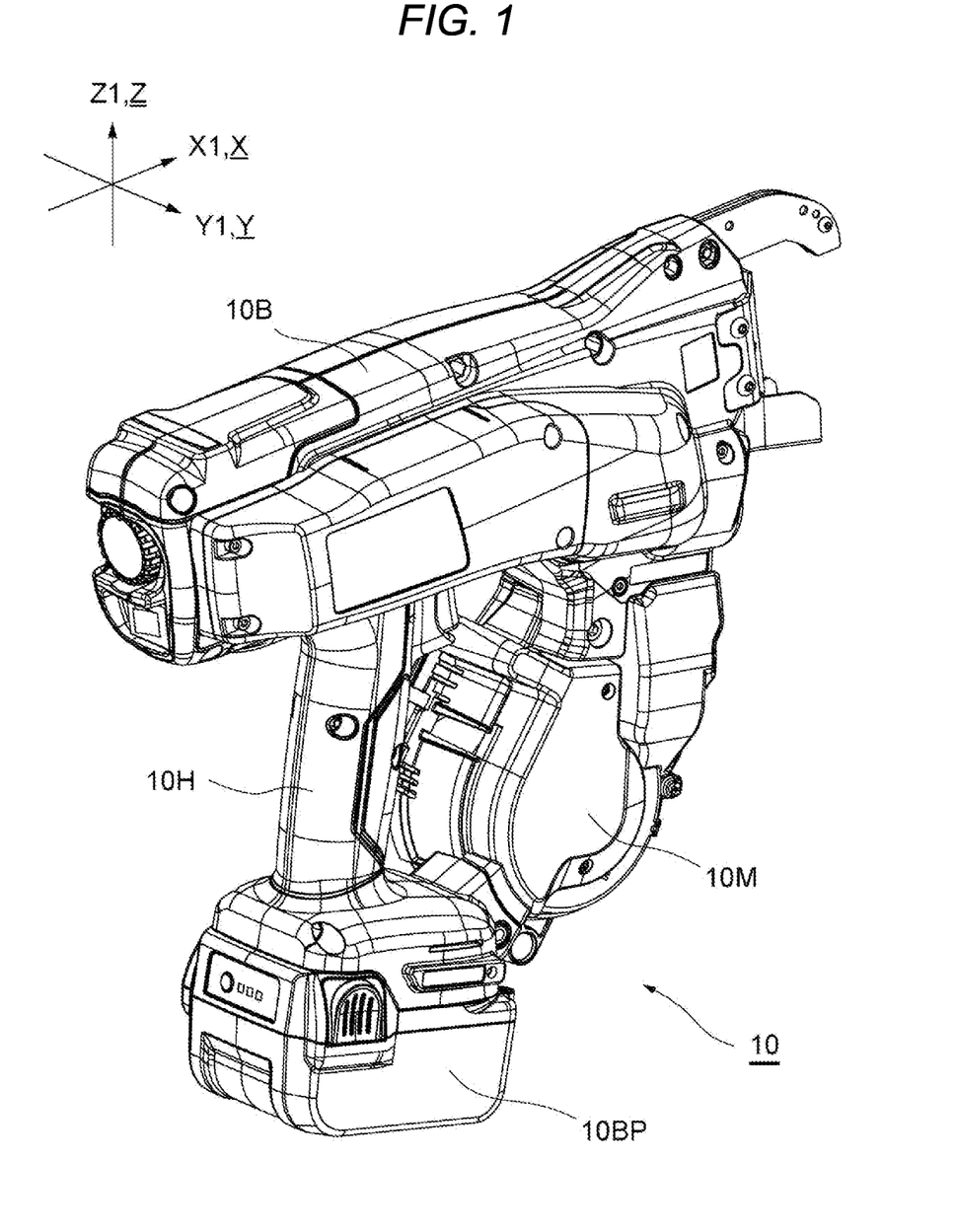
FIG. 1 is a perspective view of an electric power tool according to an embodiment.

Hereinafter, an embodiment in which the present invention is applied to a reinforcing bar binding machine that is an electric power tool will be described. FIG. 1 is a perspective view of a reinforcing bar binding machine 10 that is an electric power tool according to the present embodiment. FIG. 2 is a cross-sectional view obtained by cutting the reinforcing bar binding machine 10, which is the electric power tool, along a cross section perpendicular to the left-right direction Y.

The present invention can be widely applied to an electric power tool that has a communication function and performs work using an electric motor (motor), and can be applied to, for example, a drill, an impact driver, a nailer, a grinder, a reciprocating saw, and a polisher. The motor may be a brushless motor or a motor with brush.

[Basic Configuration of Electric Power Tool]

The reinforcing bar binding machine 10 according to the present embodiment is configured to bind two reinforcing bars RB or three or more reinforcing bars RB by feeding a wire W outward from an end thereof at the front side X1.

Specifically, the reinforcing bar binding machine 10 includes: a handle 10H to be gripped by a worker; a magazine 10M for accommodating the wire W; a wire feeding portion 12 for feeding the wire W outward from the end at the front side X1; a curl forming portion 14 constituting a traveling path of the wire W for winding the wire W around the reinforcing bar RB; a cutting portion 16 for cutting the wire W wound around the reinforcing bar RB; a binding portion 18 for twisting the wire W wound around the reinforcing bar RB; a tool controller that includes a drive controller 22 for controlling both a feeding motor 12M and a binding motor 18M that are provided in the wire feeding portion 12 and the binding portion 18, respectively; and a communication portion 30 that includes a communication device 32 for the reinforcing bar binding machine 10 to communicate with an external device, and a communication controller 34 for controlling the communication device 32.

In the reinforcing bar binding machine 10 of the present embodiment, the curl forming portion 14, the cutting portion 16, the binding portion 18, the tool controller, and the communication portion 30 constitute a main body 10B of the reinforcing bar binding machine 10. The magazine 10M is provided extending from a lower portion of the main body 10B at the front side X1 to the lower side Z2. The handle 10H is provided extending from a lower portion of the main body 10B at the rear side X2 to the lower side Z2. Thus, the magazine 10M is provided at the front side X1 with respect to the handle 10H, and the handle 10H is provided at the rear side X2 with respect to the magazine 10M. Further, a lower portion of the magazine 10M and a lower portion of the handle 10H are connected to each other. Hereinafter, the configurations will be described.

The reinforcing bar binding machine 10 includes the handle 10H that extends from the main body 10B to the lower side Z2. The handle 10H corresponds to a portion where a worker grips the reinforcing bar binding machine 10. A lower end of the handle 10H is formed such that a main battery 10BP can be detachably attached thereto. A trigger 10HT is provided on a surface of the handle 10H facing the front side X1. The reinforcing bar binding machine 10 is configured such that, when the worker presses the trigger 10HT toward the rear side X2, the tool controller starts a control operation to start a binding operation as will be described later.

The magazine 10M rotatably and detachably houses a reel RL around which the linear wire W is wound. Here, the reel RL is configured to simultaneously feed one or more wires W. The wire W is a linear body suitable for binding the reinforcing bar RB, such as a long metal wire having flexibility (including a coated metal wire).

The wire feeding portion 12 includes a pair of gears 12G configured to advance the wire W by rotating in different directions from each other with the wire W sandwiched therebetween, and the feeding motor 12M (an example of an "electric motor") configured to drive the gears 12G. The feeding motor 12M includes a rotor and a stator. The wire feeding portion 12 is configured to feed the wire W outward by rotating the rotor of the feeding motor 12M in a forward direction and to pull back the wire W by rotating the rotor in a reverse direction. The tool controller that controls the feeding motor 12M of the wire feeding portion 12 will be described later.

The curl forming portion 14 includes a curl guide 14A configured to curve and curl the wire W fed by the wire feeding portion 12, and an introducing guide 14B configured to introduce the wire W curled by the curl guide 14A to the binding portion 18. The curl guide 14A is configured to curve the wire W into a loop shape by advancing the wire W along an inner wall surface. Therefore, when the wire W is fed in a state where a plurality of reinforcing bars RB are arranged extending in the left-right direction Y in a space between the curl guide 14A and the introducing guide 14B, it is possible to wind the wire W around the reinforcing bars RB.

The cutting portion 16 includes a fixed blade, a movable blade that cuts the wire W in cooperation with the fixed blade, and a transmission mechanism 16A that transmits an operation of the binding portion 18 to the movable blade. The cutting portion 16 is configured to cut the wire W by a rotational operation of the movable blade with the fixed blade serving as a fulcrum shaft. The transmission mechanism 16A is configured to transmit the operation of the binding portion 18 to the movable blade and configured to rotate the movable blade in conjunction with a binding operation of the binding portion 18. Therefore, the transmission mechanism 16A rotates the movable blade in conjunction with the operation of the binding portion 18, whereby the wire W can be cut at a predetermined timing as will be described later.

The binding portion 18 includes a pair of hooks 18H configured to be openable and closable in order to clamp the wire W, a rotary shaft for rotating the pair of hooks 18H with the front-rear direction X as a rotation axis, a speed reducer configured to move the rotary shaft in a rotation axis direction (front-rear direction X) and configured to rotate the rotary shaft moved to the front side X1, and the binding motor 18M configured to be rotatable about a rotation axis AX.

The rotary shaft of the binding portion 18 rotates in a forward direction when the binding motor 18M rotates in a forward direction. A sliding portion is provided around the rotary shaft, and the sliding portion is configured to move toward the front side X1 when the rotary shaft rotates in the forward direction. The wire W fed by the feeding motor 12M in a state where the pair of hooks 18H are opened proceeds while being curved along inner wall surfaces of the curl guide 14A and the introducing guide 14B, and a leading end of the wire W passes through a gap between the pair of hooks 18H. In this state, when the binding motor 18M rotates in the forward direction and the rotary shaft rotates in the forward direction, the sliding portion moves to the front side X1 and the pair of hooks 18H are closed. Therefore, the pair of hooks 18H can clamp the wire W. When the binding motor 18M further rotates in the forward direction and the rotary shaft rotates in the forward direction to move the sliding portion to the front side X1, the movable blade is rotated by the transmission mechanism 16A to cut the wire W. When the binding motor 18M further rotates in the forward direction, the binding portion 18 bends the leading end of the cut wire W in a state where the wire W is sandwiched by the pair of hooks 18H. When the binding motor 18M further rotates in the forward direction, the rotary shaft rotates together with the sliding portion with the front-rear direction X as a rotation axis. The rotary shaft rotates in the state where the wire W is sandwiched by the pair of hooks 18H, whereby the pair of hooks 18H twist the wire W.

[Electric Circuit Configuration of Electric Power Tool]

Figure 3:
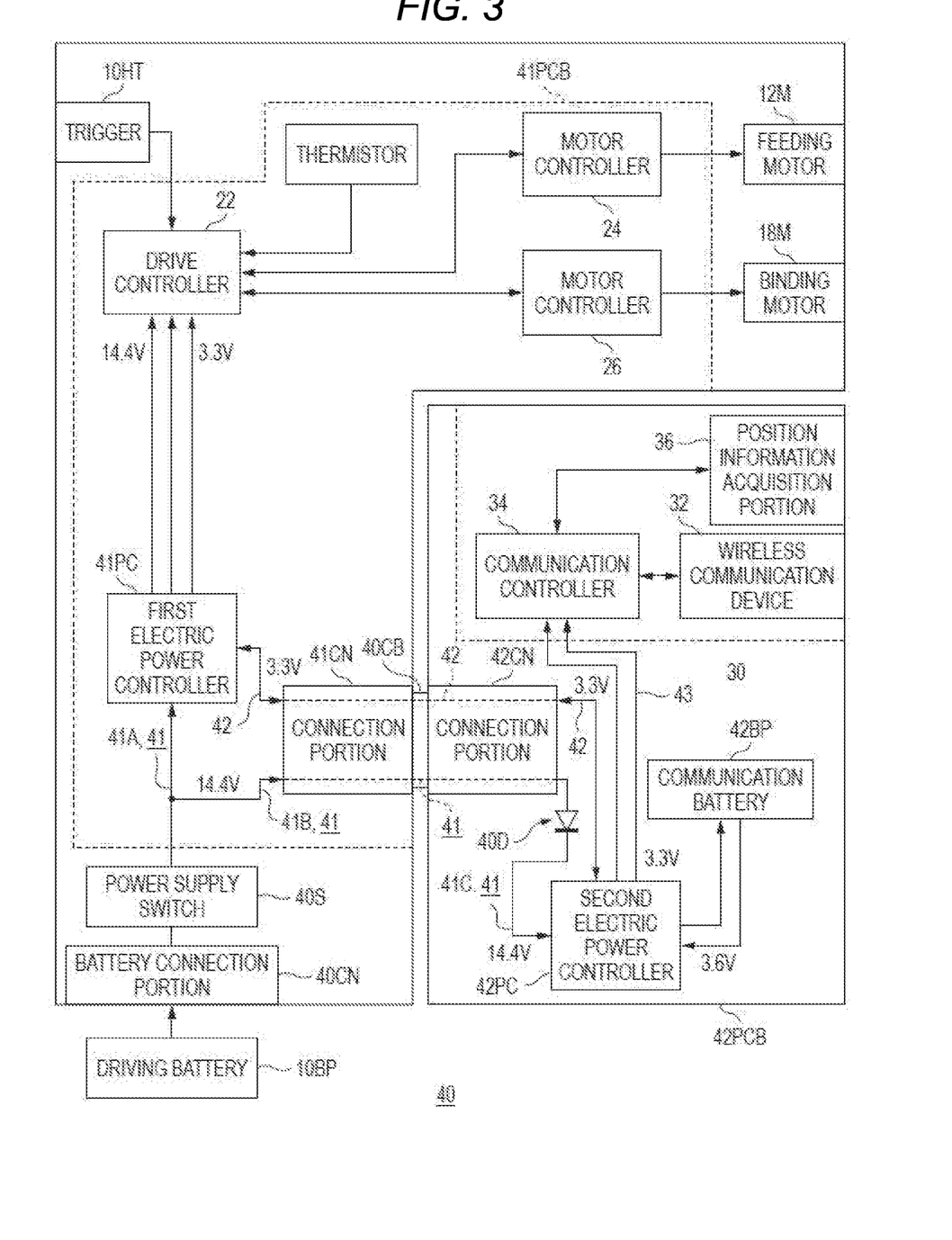
FIG. 3 is a block diagram illustrating an electric circuit configuration of the electric power tool according to the embodiment.

FIG. 3 is a block diagram illustrating an electric circuit configuration of the reinforcing bar binding machine 10 according to the present embodiment. In the electric circuit configuration of the reinforcing bar binding machine 10, a configuration for controlling the feeding motor 12M, a configuration for controlling the communication device 32, and a configuration for supplying electric power (voltage) to these configurations constitute a power supply device 40 of the present embodiment.

Specifically, the power supply device 40 according to the present embodiment includes: a battery connection portion 40CN for receiving supply of electric power (voltage) from the battery 10BP (which may be referred to as a "driving battery" or a "first battery"); a power supply switch 40S for turning on or off supply of electric power (voltage) supplied from the battery connection portion 40CN; a first electric power controller 41PC (an example of a "first voltage supply portion") that receives supply of electric power (voltage) from the battery 10BP via the power supply switch 40S and that supplies, based on a first power supply voltage supplied from the battery 10BP, a first operating voltage for operating the drive controller 22 (an example of a "first controller"); the drive controller 22 that operates based on the first operating voltage and generates a control signal for controlling the feeding motor 12M; and a motor controller 24 that controls a current flowing through the stator of the feeding motor 12M based on the control signal generated by the drive controller 22.

The battery 10BP is configured to supply electric power for operating at least the drive controller 22, the motor controller 24, the feeding motor 12M, the binding motor 18M, the communication controller 34, a wireless communication device 32, and a position information acquisition portion 36, the last three of which are to be described later. The battery 10BP is, for example, a rechargeable lithium ion secondary battery, and has a predetermined rated capacity, rated voltage, and rated current. For example, the battery 10BP has a rated capacity of 5.0 Ah, and is configured to supply a DC voltage having a rated value of 14.4 V. However, as will be described later, the DC voltage supplied from the battery 10BP decreases gradually accompanying power consumption of the battery 10BP.

The battery connection portion 40CN receives supply of the DC voltage from the battery 10BP and supplies the DC voltage to the first electric power controller 41PC. The power supply device 40 includes a first voltage line 41 that connects the battery connection portion 40CN and the first electric power controller 41PC, and the first power supply voltage of DC supplied from the battery 10BP is applied to the first voltage line 41.

According to an operation of a main power supply switch (not illustrated) of the reinforcing bar binding machine 10, the power supply switch 40S turns on or off the supply of electric power (voltage) that is supplied from the battery 10BP to the first electric power controller 41PC via the battery connection portion 40CN. Specifically, when a worker turns off the main power supply switch, the power supply switch 40S cuts off (turns off) the supply of electric power (voltage) from the battery 10BP to the first electric power controller 41PC, and when the worker turns on the main power supply switch, the power supply switch 40S permits (turns on) the supply of electric power (voltage) from the battery 10BP to the first electric power controller 41PC.

The first electric power controller 41PC generates, based on the first power supply voltage supplied from the battery 10BP, a voltage for operating circuit elements including the drive controller 22, and supplies the voltage to the circuit elements and the like. The first electric power controller 41PC (first voltage supply portion) is, for example, a circuit. For example, the first electric power controller 41PC is configured to generate, based on the first power supply voltage of 14.4 V supplied from the battery 10BP, a voltage of 3.3 V (an example of a "first operating voltage") that is an operating voltage of the drive controller 22, and configured to supply the voltage of 3.3 V to the drive controller 22, and configured to further supply the first power supply voltage (14.4 V) to the motor controller 24, a motor controller 26 and stators of respective motors. Here, supplying a voltage includes generating and supplying a voltage, and passing through and supplying a voltage without generating the voltage. The first electric power controller 41PC is configured to further generate an intermediate voltage higher than the first operating voltage and lower than the first power supply voltage and configured to supply the intermediate voltage to different circuit elements. The first electric power controller 41PC may include a booster circuit that is configured to generate a voltage higher than the first power supply voltage and configured to supply the generated voltage to different circuit elements.

The drive controller 22 operates based on a voltage of 3.3 V, for example, to generate a control signal for controlling the feeding motor 12M and supplies the control signal to the motor controller 24. In addition, the drive controller 22 is configured to control other actuators and the like of the reinforcing bar binding machine 10. Further, the drive controller 22 supplies the first power supply voltage, which is supplied from the first electric power controller 41PC, to (for example, a positive power supply line of) the motor controller 24. The drive controller 22 is further configured to receive a signal detecting that the trigger 10HT is pressed, and configured to start a motor control operation based on reception of the signal. In addition, the drive controller 22 may be configured to receive a signal indicating a temperature of the electric power tool (reinforcing bar binding machine 10) from a thermistor and configured to control the feeding motor 12M based on reception of the signal. For example, the drive controller 22 may generate different control signals in cases of a relatively high temperature and a relatively low temperature of the electric power tool and may supply the control signals to the motor controller 24.

The drive controller 22 may include a single or a plurality of processors implemented by an integrated circuit (IC), and a memory (including a non-volatile semiconductor memory storing information in a non-transitory manner) storing firmware that is executed by the processor and that includes a computer command for executing various types of processing described in the present embodiment. The drive controller 22 (first controller) is, for example, a circuit. The drive controller 22 may be implemented by an IC such as an ASIC, an FPGA, a microcontroller, or the like. The drive controller 22 also functions as a part of the tool controller.

The motor controller 24 controls a current flowing through the stator of the feeding motor 12M based on a control signal generated by the drive controller 22. For example, the motor controller 24 may include a plurality of (for example, six) semiconductor elements connected in a three-phase bridge manner between a positive power supply line and a negative power supply line of a ground (reference potential), and a driver circuit for generating and supplying a gate signal (or a base signal) to a gate (or a base) of each semiconductor element.

The feeding motor 12M, which is an electric motor according to the present embodiment, includes, for example, a stator including three-phase windings connected to three-phase outputs of the motor controller 24, and a rotor configured to be rotatable in both forward and reverse directions according to a rotating magnetic field generated by a current flowing through the windings of the stator. The feeding motor 12M may further include, for example, a Hall element for detecting a position of the rotor, and the drive controller 22 may be configured to receive a position signal from the Hall element and configured to generate a control signal based on the position signal.

Similarly, although a detailed description is omitted, the power supply device 40 includes, for the binding motor 18M, a drive controller that generates a control signal for controlling the binding motor 18M and supplies the control signal to the motor controller 26 of the binding motor 18M, and the motor controller 26 that controls a current flowing through the stator of the binding motor 18M based on the control signal generated by the drive controller. The drive controller of the binding motor 18M and the drive controller 22 of the feeding motor 12M may be provided in the same semiconductor chip.

The power supply device 40 further includes a first circuit board 41PCB on which at least the first electric power controller 41PC, the drive controller 22, the motor controller 24, and the motor controller 26 are mounted. The first circuit board 41PCB is provided with a first connection portion 41CN (an example of a "first connector") for connecting to a second circuit board 42PCB described later via a cable 40CB. As illustrated in FIG. 3, the first voltage line 41 includes a first wiring 41A connecting the battery connection portion 40CN and the first electric power controller 41PC, and a second wiring 41B branching from the first wiring 41A and connected to the first connection portion 41CN. The power supply device 40 further includes a second voltage line 42 to which the first operating voltage (3.3 V) generated by the first electric power controller 41PC can be applied and that connects the first electric power controller 41PC and the first connection portion 41CN. The first circuit board 41PCB in FIG. 3 is drawn conceptually, and the actual first circuit board 41PCB is formed in a rectangular shape having two parallel long sides and two parallel short sides connecting ends of the long sides.

With the above configuration, it is possible to supply electric power for implementing the functions of the electric power tool. Next, a configuration related to a communication function of the electric power tool will be described.

As illustrated in FIG. 3, the power supply device 40 includes: a second battery 42BP for communication (also may be referred to as a "communication battery"); a second electric power controller 42PC (an example of a "second voltage supply portion") that is configured to supply, based on the first power supply voltage supplied from the main battery 10BP, a second operating voltage for operating the communication controller 34 (an example of a "second controller"), and that is configured to supply, based on a second power supply voltage supplied from the second battery 42BP in cases such as one where the main battery 10BP is removed, the second operating voltage for operating the communication controller 34; and the communication controller 34 that controls the wireless communication device 32 (an example of the "communication device 32") and the position information acquisition portion 36 based on the second operating voltage supplied from the second electric power controller 42PC.

The communication portion 30 of the electric power tool includes the position information acquisition portion 36 that acquires position information of the electric power tool and supplies the position information to the communication controller 34, and the wireless communication device 32 for wirelessly transmitting information to and receiving information from an external device.

The position information acquisition portion 36 includes, for example, an antenna configured to receive a signal from a positioning satellite of GPS (or another GNSS such as GLONASS), and a reception circuit that acquires position information of the electric power tool based on the signal received by the antenna.

For example, the wireless communication device 32 includes: an antenna that is configured to transmit information to and receive information from a remote base station according to a predetermined standard by using a frequency band of a licensed band or an unlicensed band based on the LPWA technology; an RFIC that is configured to demodulate an analog signal received by the antenna and configured to supply the demodulated analog signal to a baseband IC, and that is configured to modulate a signal supplied from the baseband IC into an analog signal and configured to transmit the analog signal from the antenna; and the baseband IC that decodes or encodes a signal acquired from the RFIC according to a protocol defined by the standard and transmits and receives information. The communication device 32 may be compatible with a short-distance wireless communication system such as Bluetooth (registered trademark) or a wireless LAN.

With the above-described configuration, for example, the communication controller 34 is configured to provide the position information of the electric power tool to an external device by transmitting, via the wireless communication device 32, the position information acquired by the position information acquisition portion 36. The communication controller 34 (second controller) is, for example, a circuit. In the present embodiment, the communication controller 34, the RFIC, and the baseband IC may be stacked in the same semiconductor package. The communication controller 34 and the baseband IC may be formed of the same semiconductor chip.

The power supply device 40 further includes the second circuit board 42PCB on which at least the second electric power controller 42PC, the communication controller 34, the communication device 32, and the position information acquisition portion 36 are mounted. The second circuit board 42PCB is provided with a second connection portion 42CN (an example of a "second connector") for connecting to the first circuit board 41PCB via the cable 40CB. As illustrated in FIG. 3, with respect to the first voltage line 41, the first wiring 41A and the second wiring 41B are formed on the first circuit board 41PCB, and a third wiring 41C electrically connected to the first wiring 41A and the second wiring 41B via the connectors is formed on the second circuit board 42PCB. With respect to the second voltage line 42, a wiring connecting the first connection portion 41CN and the first electric power controller 41PC is formed on the first circuit board 41PCB, and a wiring electrically connected to the former wiring via the connectors and connected to the second electric power controller 42PC is formed on the second circuit board 42PCB.

The second battery 42BP further provided in the power supply device 40 supplies electric power for operating at least the communication controller 34, the wireless communication device 32, and the position information acquisition portion 36. The second battery 42BP is, for example, a rechargeable lithium ion secondary battery, and has a predetermined rated capacity, rated voltage, and rated current. For example, the second battery 42BP has a smaller rated capacity than the main battery 10BP, and is configured to supply a DC voltage having a rated value of 3.6 V (an example of the "second power supply voltage"). In addition, since the second battery 42BP is housed in a housing constituting the main body 10B of the electric power tool, unlike the main battery 10BP, the second battery 42BP is not provided to be easily detachable but is integrally fixed to the second circuit board 42PCB. The second battery 42BP may not be integrally fixed to the second circuit board 42PCB, and may be detachably provided on the second circuit board 42PCB, for example.

The second electric power controller 42PC is configured to generate, based on a power supply voltage supplied from the battery 10BP, a voltage for operating circuit elements including the communication controller 34 and the drive controller 22, and configured to supply the voltage to the circuit elements and the like. The second electric power controller 42PC (second voltage supply portion) is, for example, a circuit. For example, the second electric power controller 42PC generates, based on a power supply voltage of 14.4 V supplied from the battery 10BP, a voltage (an example of a "second operating voltage") of 3.3 V that is an operating voltage of the communication controller 34, and supplies the voltage to the communication controller 34 by a third voltage line 43 connecting the second electric power controller 42PC and the communication controller 34, and similarly, generates a predetermined operating voltage and supplies the predetermined operating voltage to the position information acquisition portion 36 and the wireless communication device 32.

In addition, the second electric power controller 42PC is configured to generate, based on a DC voltage of 3.6 V corresponding to the second power supply voltage supplied from the second battery 42BP, an operating voltage for operating circuit elements and the like, and configured to supply the generated operating voltage to the circuit elements including the communication controller 34 and the drive controller 22. Here, the second electric power controller 42PC includes a booster circuit that is configured to generate a voltage higher than the second power supply voltage in order to operate the antenna. However, the reinforcing bar binding machine 10 may not necessarily include the booster circuit. In the present embodiment, since an operating voltage of the antenna is higher than the second power supply voltage, the reinforcing bar binding machine 10 includes a booster circuit such as a charge pump circuit. However, for example, when a circuit element to be driven by electric power of the second battery 42BP is selected or the second power supply voltage is set such that an operating voltage of the circuit element is equal to or lower than the second power supply voltage, the reinforcing bar binding machine 10 may not necessarily include the booster circuit.

With the above configuration, when the main battery 10BP is removed, the second electric power controller 42PC operates the drive controller 22, the communication controller 34, the position information acquisition portion 36, and the wireless communication device 32 based on the second power supply voltage supplied from the second battery 42BP, thereby enabling wireless transmission and reception of information with an external device. Accordingly, even when the main battery 10BP is removed, the communication controller 34 can provide the position information of the electric power tool to the outside by transmitting, via the wireless communication device 32, the position information acquired by the position information acquisition portion 36, and can store update data for updating the firmware of the drive controller 22 that is received via the wireless communication device 32 in, for example, a non-volatile semiconductor memory constituting the drive controller 22.

Further, the second electric power controller 42PC is configured to generate, based on the power supply voltage supplied from the main battery 10BP, a charging voltage for charging the second battery 42BP, and configured to charge the second battery 42BP. Accordingly, when the battery 10BP is attached, the power supply device 40 according to the present embodiment is configured to operate the drive controller 22, the motor controller 24, the motor controller 26, the motors (the feeding motor 12M and the binding motor 18M), the communication controller 34, the position information acquisition portion 36, and the wireless communication device 32 based on the electric power supplied from the battery 10BP and configured to charge the second battery 42BP based on the electric power supplied from the battery 10BP. When the main battery 10BP is removed, the power supply device 40 is configured to operate the drive controller 22, the communication controller 34, the position information acquisition portion 36, and the wireless communication device 32 based on the electric power supplied from the second battery 42BP. As described above, since supplying a voltage includes passing through and supplying a voltage without generating the voltage, a voltage serving as a power supply may be supplied to the communication controller 34 and the like by directly connecting a wiring to which an output voltage from the second battery 42BP is applied, to a power supply terminal of the communication controller 34 and the like, or the voltage serving as a power supply may be supplied to the drive controller 22 and the like by directly connecting a wiring to which an output voltage from the second electric power controller 42PC is applied, to a power supply terminal of the drive controller 22 and the like.

The power supply device 40 further includes the second circuit board 42PCB on which at least the second electric power controller 42PC, the communication controller 34, the position information acquisition portion 36, and the wireless communication device 32 are mounted. The second circuit board 42PCB is provided with a second connection portion 42CN (an example of a "second connector") for connecting to the first circuit board 41PCB via the cable 40CB.

As illustrated in FIG. 3, the first voltage line 41 to which the power supply voltage from the battery 10BP is applied not only supplies a voltage to the first electric power controller 41PC via the power supply switch 40S, but also supplies a voltage to the second power controller 42PC by including a wiring that is connected to the second electric power controller 42PC via the first connection portion 41CN of the first circuit board 41PCB, the cable 40CB, and the second connection portion 42CN of the second circuit board 42PCB.

Further, the second voltage line 42 to which the first operating voltage (3.3 V) generated by the first electric power controller 41PC is applied, includes a wiring connected to the second electric power controller 42PC and the communication controller 34 via the connection portion of the first circuit board 41PCB, the cable 40CB, and the connection portion of the second circuit board 42PCB. Accordingly, when the main battery 10BP is attached, the second voltage line 42 is configured to supply electric power (voltage and current) in a direction from the first electric power controller 41PC to the second electric power controller 42PC, and when the main battery 10BP is removed, the second voltage line 42 is configured to supply electric power (voltage and current) in a direction from the second electric controller 42PC to the first electric power controller 41PC.

Here, the third wiring 41C of the first voltage line 41 provided on the second circuit board 42PCB is provided with a diode (an example of a "backflow suppression circuit") having an anode connected to a first electric power controller 41PC side and a cathode connected to a second electric power controller 42PC side. The diode serves as a circuit capable of permitting a current to flow from the first electric power controller 41PC to the second electric power controller 42PC and suppressing a current from flowing from the second electric power controller 42PC to the first electric power controller 41PC. The backflow suppression circuit may be provided in the second wiring 41B of the first voltage line 41 provided on the first circuit board 41PCB.

The inventors of the present application focused on a fact that in a case where a plurality of batteries 10BP are mounted on the electric power tool, electric power of the second battery 42BP is also unintentionally consumed when the electric motors and the communication device 32 are driven by being supplied with electric power from the main battery 10BP, and conceived of providing a backflow suppression circuit, and verified that power consumption of the second battery 42BP can be suppressed by the backflow suppression circuit.

That is, in a case of a configuration in which no backflow suppression circuit is provided, a DC voltage supplied from the main battery 10BP and applied to the first voltage line 41 decreases gradually accompanying the use of the electric power tool, and for example, a DC voltage lower than the original 14.4 V is supplied. When the use of the electric motor (for example, the feeding motor 12M) of the electric power tool is still continued even though the DC voltage applied to the first voltage line 41 is decreased, a phenomenon is observed in which electric power is supplied from the second battery 42BP to the electric motor to compensate for the insufficient electric power. At this time, in the first voltage line 41, in addition to the current flowing from the main battery 10BP to the first electric power controller 41PC, a current flowing from the second battery 42BP to the first electric power controller 41PC via the second electric power controller 42PC is observed. As a result, there is a possibility that the second battery 42BP cannot be charged as expected, or there is a possibility that sufficient electric power cannot be provided to the communication controller 34 or the like due to a shortage of electric power of the second battery 42BP and the communication function is impaired when the main battery 10BP is removed.

Therefore, the inventors of the present application conceived of providing a backflow suppression circuit configured to permit a current to flow from the first electric power controller 41PC (first voltage supply portion) to the second electric power controller 42PC (second voltage supply portion) in the first voltage line 41 and configured to suppress a current from flowing from the second electric power controller 42PC (second voltage supply portion) to the first electric power controller 41PC (first voltage supply portion).

By providing the backflow suppression circuit, it is possible to suppress the flow from the second battery 42BP to the first electric power controller 41PC via the second electric power controller 42PC, and thus it is possible to effectively use the main battery 10BP and the second battery 42BP.

The second voltage line 42 is preferably configured to permit a current to flow from the first electric power controller 41PC (first voltage supply portion) to the second electric power controller 42PC (second voltage supply portion) and configured to permit a current to flow from the second electric power controller 42PC (second voltage supply portion) to the first electric power controller 41PC (first voltage supply portion).

With such a configuration, the electric power (voltage) can be supplied to the power supply terminal of the drive controller 22 of the first circuit board 41PCB via the second voltage line 42 that connects the second circuit board 42PCB which is a communication board, the second connector, the first connector, and the first electric power controller 41PC.

Therefore, when the main battery 10BP is removed, the drive controller 22 can be operated. For example, the drive controller 22 can update firmware that is a control program. Accordingly, it is possible to reduce a situation where the work of a worker has to be interrupted for updating the firmware of the drive controller 22, thereby improving work efficiency of the worker.

The second voltage line 42 may be provided so as to connect the first connector and the power supply terminal of the drive controller 22 of the first circuit board 41PCB directly without using the first electric power controller 41PC as an intermediary.

In addition, the power supply device 40 according to the present embodiment has a configuration in which the first circuit board 41PCB and the second circuit board 42PCB are connected to each other via the cable 40CB (including a wiring constituting a part of the first voltage line 41 and a wiring constituting a part of the second voltage line 42). Therefore, the first circuit board 41PCB and the second circuit board 42PCB can be disposed at different positions. For example, the first circuit board 41PCB may be disposed at the upper side Z1 of the binding motor 18M such that the circuit board is substantially perpendicular to the up-down direction Z, and the second circuit board 42PCB may be disposed in the left-right direction Y (for example, at the right side Y1) of the binding motor 18M such that the circuit board is substantially perpendicular to the left-right direction Y. With such a configuration, the two circuit boards can be disposed so as to surround a motor (one of the binding motor 18M and the feeding motor 12M) in a state of being substantially perpendicular to each other. Here, the two circuit boards may be arranged such that a distance between a rotation axis of the motor (for example, the rotation axis AX of the binding motor 18M) and the second circuit board 42PCB is larger than a distance between the rotation axis of the motor and the first circuit board 41PCB. With such a configuration, the second circuit board 42PCB can be disposed at a position away from the motor as compared with the first circuit board 41PCB, and thus it is possible to lower a possibility that noise caused by rotation of the motor has a bad influence on communication; the first circuit board 41PCB can be disposed at a position closer to the motor as compared with the second circuit board 42PCB, and thus it is possible to reduce a distance between the motor controller 24 (or the motor controller 26) and the stator of the motor.

[Operations of Reinforcing Bar Binding Machine]

Figure 4:
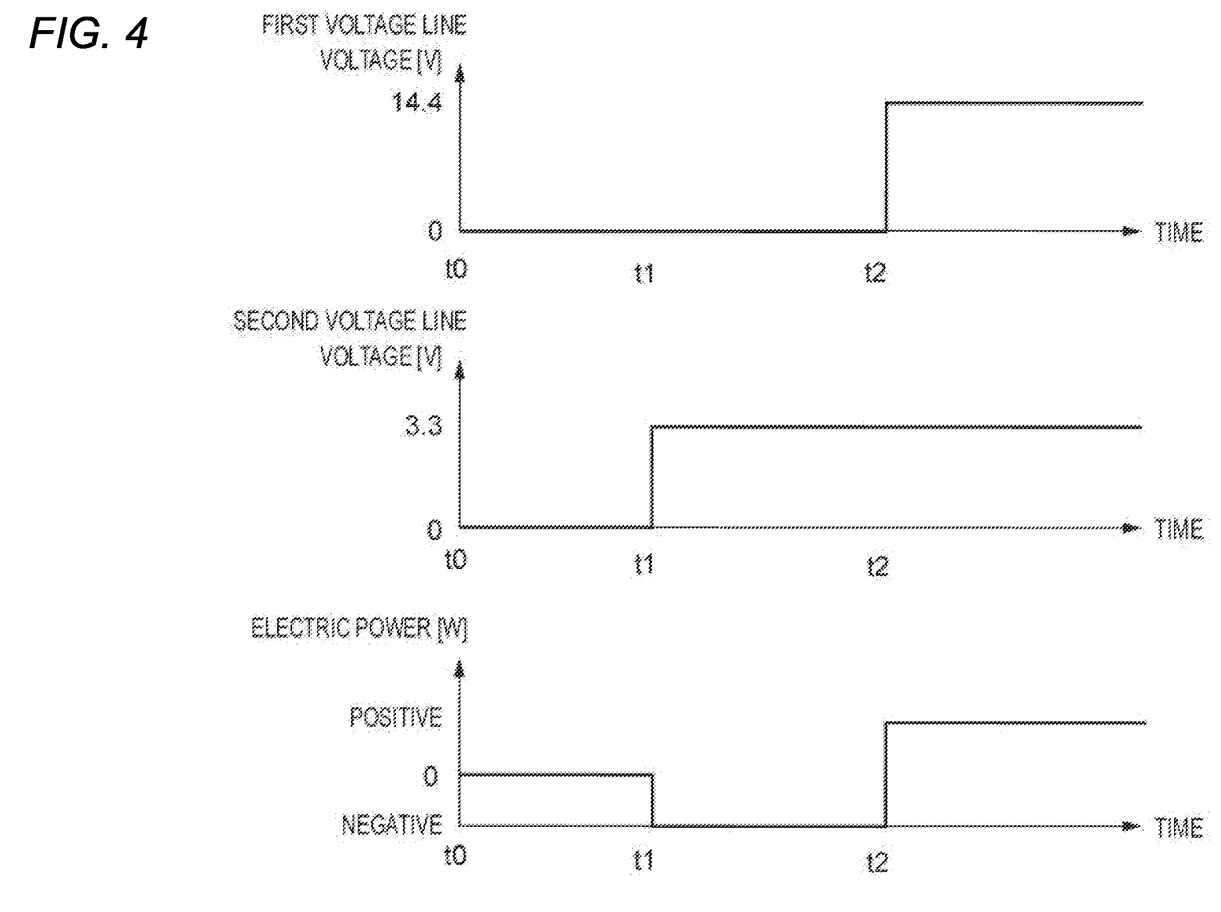
FIG. 4 is a graph illustrating voltages of a first voltage line and a second voltage line in an operating mode of a reinforcing bar binding machine according to the embodiment.

Hereinafter, operations of the reinforcing bar binding machine 10 will be described. The reinforcing bar binding machine 10 according to the present embodiment is configured to execute operating modes described below. FIG. 4 is a graph illustrating voltages of the first voltage line 41 and the second voltage line 42 in the operating modes of the reinforcing bar binding machine 10 according to the present embodiment.

FIG. 4 also illustrates a supply state of electric power from the second battery 42BP to the circuit elements on the first circuit board 41PCB. When electric power is supplied from the second battery 42BP to the circuit elements on the first circuit board 41PCB, the electric power in the graph in FIG. 4 is negative. At this time, in the wiring of the second voltage line 42 connecting the first circuit board 41PCB and the second circuit board 42PCB, a current flows from the second circuit board 42PCB to the first circuit board 41PCB, and the second battery 42BP supplies electric power to the circuit elements on the first circuit board 41PCB.

When electric power is supplied from the first battery to the circuit elements on the second circuit board 42PCB, the electric power in the graph in FIG. 4 is positive. At this time, a current flows from the first circuit board 41PCB to the second circuit board 42PCB in at least one of the wiring of the first voltage line 41 connecting the first circuit board 41PCB and the second circuit board 42PCB and the wiring of the second voltage line 42 connecting the first circuit board 41PCB and the second circuit board 42PCB, and the first battery supplies electric power to the circuit elements on the second circuit board 42PCB.

When no electric power is supplied from the first battery to the circuit elements on the second circuit board 42PCB and no electric power is supplied from the second battery 42BP to the circuit elements on the first circuit board 41PCB, the electric power in the graph in FIG. 4 is zero. At this time, no current flows through any of the wiring of the first voltage line 41 connecting the first circuit board 41PCB and the second circuit board 42PCB and the wiring of the second voltage line 42 connecting the first circuit board 41PCB and the second circuit board 42PCB.

However, the reinforcing bar binding machine 10 can execute the operating modes in different orders. The electric power tool of the present invention may be configured to execute any one of the operating modes described below, or may be configured to execute any two or more of the operating modes described below.

[Non-Operating State of Electric Motor and Drive Controller, and Operating State of Communication Device]

When the main battery 10 BP is removed or when the power supply switch 40S is turned off, the electric motors are not operated and are in a non-operating state. At this time, the communication device 32 of the electric power tool is operable.

In the operation mode from a time point t0 to a time point t1 in FIG. 4, the electric motors and the drive controller 22 of the electric power tool are in the non-operating state and the communication device 32 is in the operating state. At this time, since no DC voltage from the first battery is applied to the first voltage line 41, the first voltage line 41 has a voltage of 0 V (ground level) and no current is flowing in the first voltage line 41. Further, since it is not necessary to operate the circuit elements on the first circuit board 41PCB including the drive controller 22, the second voltage line 42 has a voltage of 0 V (ground level) and no current is flowing in the second voltage line 42. Since no electric power is supplied from the first battery to the circuit elements on the second circuit board 42PCB and from the second battery 42BP to the circuit elements on the first circuit board 41PCB, the electric power in the graph is zero.

At this time, the second battery 42BP supplies the second power supply voltage of 3.6 V to the second electric power controller 42PC, and the second electric power controller 42PC generates, based on a DC voltage of 3.6 V corresponding to the second power supply voltage supplied from the second battery 42BP, an operating voltage for operating circuit elements of the communication portion 30 and the like, and applies the operating voltage (3.3 V) of the communication controller 34 to the third voltage line 43. Similarly, the second electric power controller 42PC generates an operating voltage for operating the circuit elements such as the antenna of the communication portion 30, and supplies the operating voltage to the circuit elements including the communication controller 34. Therefore, the communication portion 30 can be operated.

With the above configuration, even when the main battery 10BP is removed, the electric power tool can provide the position information of the electric power tool to the outside by transmitting, via the wireless communication device 32, the position information acquired by the position information acquisition portion 36. Thus, even when the electric power tool is stolen, the position information of the electric power tool can be acquired.

[Non-Operating State of Electric Motor, and Operating State of Drive Controller and Communication Device]

In the operation mode (an example of a "second operation") from the time point t1 to a time point t2 in FIG. 4, the electric motors of the electric power tool are in the non-operating state, and the drive controller 22 and the communication device 32 are in the operating state. At this time, since no DC voltage from the first battery is applied to the first voltage line 41, the first voltage line 41 has a voltage of 0 V (ground level) and no current is flowing in the first voltage line 41. On the other hand, the second electric power controller 42PC applies the operating voltage (3.3 V) of the drive controller 22 to the second voltage line 42 based on the second power supply voltage supplied from the second battery 42BP. Similarly, the second electric power controller 42PC applies the operating voltage (3.3 V) of the communication controller 34 to the third voltage line 43 based on the second power supply voltage supplied from the second battery 42BP. Similarly, the second electric power controller 42PC generates an operating voltage for operating the circuit elements such as the antenna of the communication portion 30, and supplies the operating voltage to the circuit elements including the communication controller 34. At this time, since electric power is supplied from the second battery 42BP to the drive controller 22 which is a circuit element on the first circuit board 41PCB, the electric power in the graph is negative, and a current in a direction from the second circuit board 42PCB to the first circuit board 41PCB flows through the wiring of the second voltage line 42 connecting the first circuit board 41PCB and the second circuit board 42PCB. Therefore, the drive controller 22 and the communication portion 30 can be operated.

With the above configuration, even when the main battery 10BP is removed, the electric power tool can receive the update data of the firmware, which is the control program of the drive controller 22, by using the communication portion 30, can store the update data in the storage section by using the drive controller 22, and can update the firmware based on the update data.

[Operating State of Electric Motor, and Operating State of Drive Controller and Communication Device]

In the operating mode (an example of a "first operation") from the time point t2 in FIG. 4, the electric motors, the drive controller 22 and the communication device 32 of the electric power tool are in the operating state. When the worker turns on the main power supply switch to perform work, this operating mode starts. At this time, since a DC voltage from the first battery is applied to the first voltage line 41, the first voltage line 41 has a voltage of 14.4 V. When the worker presses down the trigger 10HT in this state, since the motors (the binding motor 18M and the feeding motor 12M) start to be driven, a current flows through the first wiring 41A of the first voltage line 41 toward the stators of the motors via the first electric power controller 41PC.

Further, the first battery is configured to supply electric power to the communication portion 30. Specifically, the first electric power controller 41PC is configured to generate, based on a DC voltage of 14.4 V corresponding to the first power supply voltage supplied from the first battery, a voltage of 3.3 V that is an operating voltage of the communication controller 34, and configured to supply the generated voltage to the communication controller 34 via the second voltage line 42.

In addition, when a battery charge level of the second battery 42BP is low, the first battery is configured to charge the second battery 42BP. Specifically, the second electric power controller 42PC is configured to generate, based on a DC voltage of 14.4 V corresponding to the first power supply voltage supplied from the first battery, a charging voltage for charging the second battery 42BP, and configured to charge the second battery 42BP.

At this time, since electric power is supplied from the first battery to the communication portion 30 and the second battery 42BP on the second circuit board 42PCB, the electric power in the graph is positive, and a current in a direction from the first circuit board 41PCB to the second circuit board 42PCB flows through wirings of the first voltage line 41 and the second voltage line 42 connecting the first circuit board 41PCB and the second circuit board 42PCB.

Here, since the third wiring 41C of the first voltage line 41 is provided with a diode (an example of the "backflow suppression circuit"), when the electric power is supplied from the first battery 10BP to the electric motors to drive the electric motors, it is possible to reduce a situation in which even the electric power of the second battery 42BP is unintentionally consumed for driving the electric motors.

As described above, according to the electric power tool of the present embodiment, in a case where a plurality of batteries such as a main battery and a sub battery are mounted, a situation can be reduced in which even electric power of the sub battery is consumed for driving an electric motor while the electric motor is driven by being supplied with electric power from the main battery, and each battery can be effectively used.

Various modifications can be made without departing from the gist of the present invention. For example, it is possible to add other known techniques to a part of the constituent elements of an embodiment within the scope of the ordinary creative ability of those skilled in the art. A part of constituent elements of an embodiment may be replaced with other known techniques. For example, the drive controller and the communication controller can operate at different voltages.

What is claimed is:

1. An electric power tool comprising:
   an electric motor;
   a first controller configured to control the electric motor;
   a first voltage supply portion configured to supply, based on a first power supply voltage supplied from a first battery, a first operating voltage for operating the first controller;
   a communication device;
   a second controller configured to control the communication device;
   the first battery;
   a second battery;
   a second voltage supply portion configured to supply, based on the first power supply voltage supplied from the first battery, a second operating voltage for operating the second controller, and configured to supply, based on a second power supply voltage supplied from the second battery, the second operating voltage for operating the second controller;
   a first voltage line configured to connect the first voltage supply portion and the second voltage supply portion and configured to supply the first power supply voltage;
   a second voltage line configured to connect the first voltage supply portion and the second voltage supply portion and configured to supply a second voltage lower than the first power supply voltage; and
   a backflow suppression circuit configured to permit a current to flow from the first voltage supply portion to the second voltage supply portion in the first voltage line and configured to suppress a current from flowing from the second voltage supply portion to the first voltage supply portion in the first voltage line.

2. The electric power tool according to claim 1, wherein the second voltage line is configured to permit a current to flow from the first voltage supply portion to the second voltage supply portion and configured to permit a current to flow from the second voltage supply portion to the first voltage supply portion.

3. The electric power tool according to claim 1, wherein the first operating voltage, the second operating voltage and the second voltage are the same.

4. The electric power tool according to claim 1, further comprising:
   a first circuit board on which the first controller and the first voltage supply portion are mounted;
   a second circuit board on which the second controller and the second voltage supply portion are mounted;
   a first connector provided on the first circuit board;
   a second connector provided on the second circuit board; and
   a cable configured to connect the first connector and the second connector and including a power supply line constituting at least a part of the first voltage line and a power supply line constituting at least a part of the second voltage line.

5. The electric power tool according to claim 4, wherein the backflow suppression circuit is provided a wiring of the first voltage line provided on the second circuit board.

6. The electric power tool according to claim 4, wherein the backflow suppression circuit is provided a wiring of the first voltage line provided on the first circuit board.

7. The electric power tool according to claim 1, wherein when the first power supply voltage is applied from the first battery to the first voltage line, a first operation is to be executed in which a current flows from the first battery to the second voltage supply portion in the first voltage line and a current flows from the first voltage supply portion to the second voltage supply portion in the second voltage line, and when the first power supply voltage is not applied from the first battery to the first voltage line, a second operation is to be executed in which no current flows in the first voltage line and a current flows from the second voltage supply portion to the first voltage supply portion in the second voltage line.

8. The electric power tool according to claim 1, wherein the backflow suppression circuit is a diode having an anode connected to side of the first voltage supply portion and a cathode connected to a side of the second voltage supply portion.

* * * * *